United States Patent [19]

Hobbs

[11] Patent Number: 4,504,077

[45] Date of Patent: Mar. 12, 1985

[54] IMPLEMENT ATTACHMENT DEVICES FOR LAND VEHICLES

[75] Inventor: Albert W. Hobbs, Slinfold, England

[73] Assignee: Century Fabrications Ltd., West Sussex, England

[21] Appl. No.: 432,850

[22] Filed: Oct. 5, 1982

[30] Foreign Application Priority Data

Nov. 5, 1981 [GB] United Kingdom ................. 8133351

[51] Int. Cl.³ ............................................ B60D 1/18

[52] U.S. Cl. ........................... 280/490 R; 280/456 R; 414/629

[58] Field of Search ........... 280/490 R, 490 A, 456 R, 280/456 A; 414/629, 640

[56] References Cited

U.S. PATENT DOCUMENTS

| | | | |
|---|---|---|---|
| 3,490,633 | 1/1970 | Avis et al. | 414/631 |
| 4,153,270 | 5/1979 | Brockmiller | 280/490 R |
| 4,356,893 | 11/1982 | Johannson | 414/631 |

FOREIGN PATENT DOCUMENTS

| | | |
|---|---|---|
| 1181589 | 2/1970 | United Kingdom . |
| 1317532 | 5/1973 | United Kingdom . |
| 1389354 | 4/1975 | United Kingdom . |
| 1431777 | 4/1976 | United Kingdom . |
| 1486499 | 9/1977 | United Kingdom . |
| 2022552 | 12/1979 | United Kingdom . |
| 2042470 | 9/1980 | United Kingdom . |
| 1591061 | 6/1981 | United Kingdom . |

*Primary Examiner*—Joseph F. Peters, Jr.
*Assistant Examiner*—Donn McGiehan
*Attorney, Agent, or Firm*—Lucas & Just

[57] ABSTRACT

A land vehicle, which can easily be provided with a large number of different tools, which tools can be used in a number of different locations, has a frame (3,4) secured to the vehicle and preferably extending across the full width thereof, a mast (10,11) laterally slidable on the frame (3,4), tool-attachment means (15) slidably mounted on the mast (10,11), and power-controlled means (12,14) for raising and lowering said tool-attachment means (15) on the mast (10,11).

8 Claims, 1 Drawing Figure

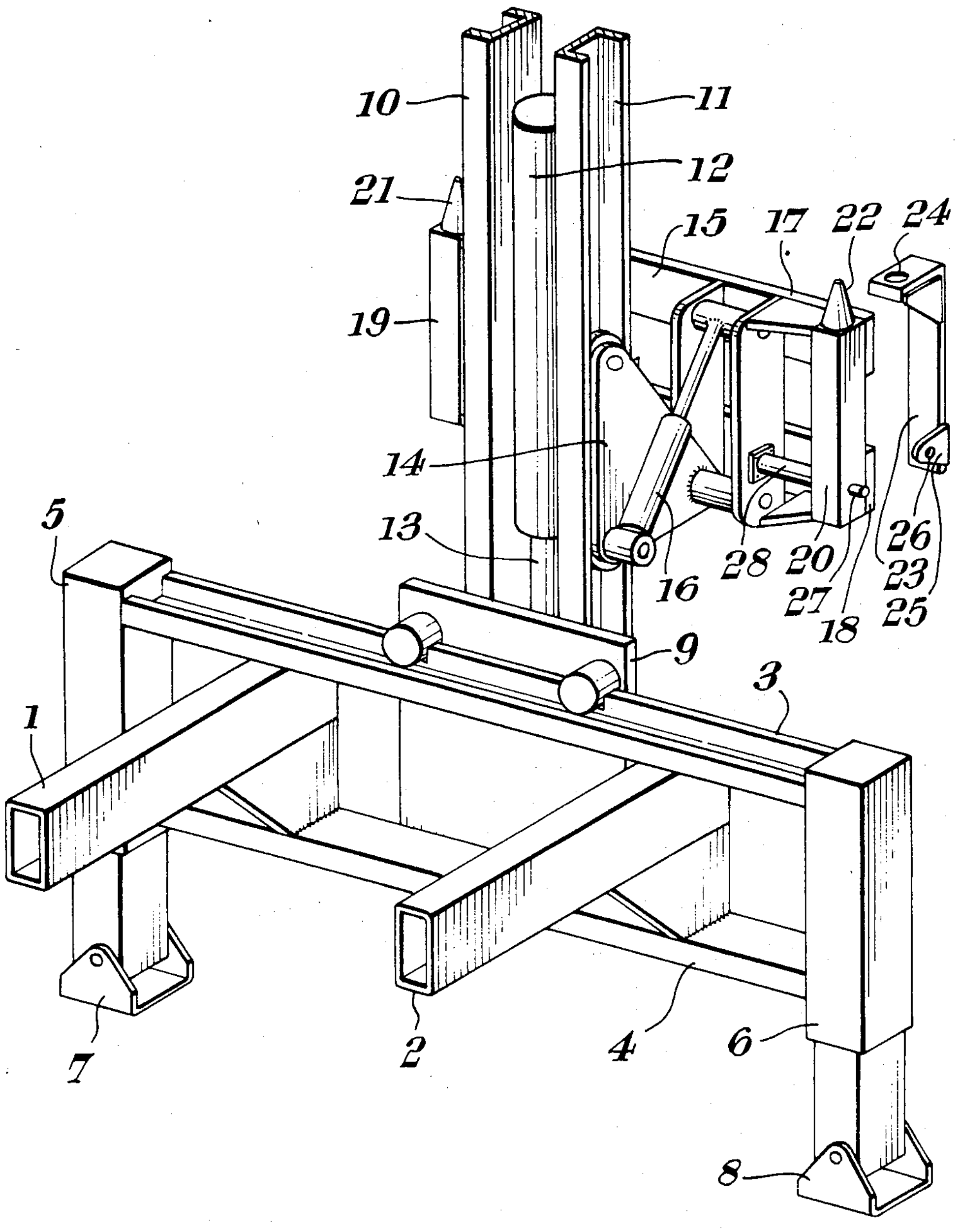
10
11
12
21
15
17
22
24
19
14
13
5
16
28
20
27
18
26
23
25
9
3
1
2
4
6
7
8

IMPLEMENT ATTACHMENT DEVICES FOR LAND VEHICLES

This invention relates to land vehicles provided with tool-attachment means.

It is well-known to provide a three-point hitch on the rear of a tractor to enable a variety of different agricultural implements to be attached to the hitch points. It is also known to provide other types of implement fixed either to the front or the rear of land vehicles. In some cases, implements may be connected both to the front and to the rear of a vehicle. However, apart from agricultural tractors provided with three-point hitches, it is usual for vehicles to be purpose-built to receive particular implements. For example, a vehicle may be provided with hydraulically controlled arms which are a permanent part of the vehicle, even though the arms may be designed themselves to receive a number of different types of bucket or digging device. Yet another type of implement fitted to vehicles are lifting forks. In such vehicles, a mast is normally fitted at the front of the vehicle and a pair of arms extending horizontally from the vehicle are designed to be raised and lowered up and down the mast.

In certain situations, for example when carrying out work on or in the ground close to buildings, walls or hedges, it is desirable that an implement should be located close to one side of the vehicle so that it can reach the ground close to the obstruction. For this purpose, vehicles are known having implements mounted off the fore-and-aft centre line.

Most of known vehicles of the kind described above suffer from the disadvantage that they are relatively inflexible and cannot be used with more than a limited number of different implements or in a limited number of different environments.

Accordingly, it is an object of the present invention to provide a land vehicle which does not suffer from the above disadvantage.

The invention consists in a land vehicle having a mast laterally slidable on a frame secured to the vehicle, tool-attachment means slidably mounted on the mast, and power controlled means for raising and lowering said attachment means on said mast.

Preferably the frame extends across the full width of the vehicle and may be mounted either at the front or the rear of the vehicle. Preferably the frame is provided at each end with a ground-engaging jack for stabilising purposes.

Preferably the tool-attachment means are mounted on an intermediate carriage which is capable of being raised and lowered up and down the mast. The tool-attachment means may be in the form of a mounting frame or plate pivotally mounted on the carriage so that it is capable of being tilted about an axis which is normally horizontal when the vehicle is level.

Power operated means may be provided to traverse the mast across the frame but, in most cases, the mast will normally merely be mounted in such a way that it can be manually moved across the frame and locked in any desired position.

One method of performing the invention will now be described with reference to the accompanying diagrammatic drawing.

In the drawing, the references 1 and 2 indicate two main structural members of the vehicle chassis. Fixed to these members is a frame including two horizontal members 3 and 4. The frame also includes two vertical end members 5 and 6. Each of the end members contains a hydraulic jack controlling ground-engaging feet 7 and 8 respectively.

Slidably mounted on the horizontal members 3 and 4 is a traversing plate 9. Hydraulic means may be provided to traverse the plate 9, but, in the arrangement shown, it is merely moved manually. Locking means which are not particularly illustrated are provided to enable the plate to be locked in any desired lateral position. Secured to this plate are two vertical members 10 and 11 constituting a mast. A hydraulic cylinder 12 is slidably mounted between the vertical members 10 and 11, and the piston rod 13 is fixed either to the plate 9 or to the two vertical members 10 and 11.

Slidably mounted in the members 10 and 11 are a pair of trunions, one of which is indicated at 14. These two trunions are secured to the cylinder 12 so that they may be raised and lowered up and down the mast by operation of the hydraulic cylinder. Pivotally mounted on the two trunions are tool-attachment means 15. The angular position of this mounting plate about the pivot axis, which will normally be horizontal when the vehicle is on level ground, is controlled by a pair of hydraulic jacks, one of which is indicated at 16.

The tool-attachment means comprises a pair of horizontal members 17 and 18, and a pair of vertical members 19 and 20. The two vertical members 19 and 20 are provided at their upper ends with tapered projections 21 and 22 to engage with holes in members which are secured to the implement to be used. One of these members is shown at 23, and the hole which is designed to cooperate with the projection 22 is indicated at 24. The member 23 includes a flange 25 having a hole 26. This hole is designed to receive a rod 27 slidably mounted in the attachment means 15. Preferably the rod 27 is controlled by a hydraulic cylinder 28. It is, of course, to be understood that similar locking means are provided in the vertical member 19.

It will be seen that, if the structure illustrated is fitted to a land vehicle, such vehicle may be used with a large number of different implements provided each of these implements has a pair of members similar to the member 23 attached thereto. For example, a bucket having a pair of members 23 on its rear vertical surface may be picked up by lowering the attachment means 15 down the mast, manoeuvring the vehicle so that the tapered projections 21 and 22 are substantially vertically above the holes 24, and thereafter raising the mast. If it is impossible to manoeuvre the vehicle so that the projections 21 and 22 are laterally aligned with the holes 24, it is only necessary to slide the traversing plate 9 in the required direction on the horizontal members 3 and 4. When the projections 21 and 22 are in the correct position, the attachments means 15 may be raised up the mast until the bucket has been lifted. The weight of the bucket will align the holes 25 with the rods 27 and the hydraulic cylinders 28 may then be actuated to extend the rods 27 through the respective holes 26, thereby locking the bucket and the attachment means. The bucket may thereafter be tilted by means of the hydraulic jack 12 and, if necessary, moved laterally by sliding the traversing plate 9. If the weight being lifted by the bucket causes the vehicle to be unstable, the whole apparatus may be stabilised by lowering the ground-engaging feet 7 and 8.

It is, of course, to be understood that the reference to a bucket is merely by way of example, and that a very large number of different implements may be attached to a vehicle in accordance with the invention and manoeuvred into almost any required position relative to the vehicle.

I claim:

1. A device for attaching implements to a vehicle comprising:

(a) a frame secured to the vehicle;

(b) a vertically-extending mast laterally slideable on said frame;

(c) an intermediate carriage slideably mounted for vertical movement up and down said mast;

(d) first hydraulic means operatively associated with said mast and said intermediate carriage for raising and lowering said carriage up and down said mast;

(e) a mounting plate mounted on said carriage to pivot about a horizontal pivot axis fixed in said carriage;

(f) second hydraulic means operatively associated with said carriage and said mounting plate for controlling the angular position of said mounting plate about said first axis between a first position in which said plate is inclined backwardly and a second position in which said plate is inclined forwardly; and (g) attachment means on said mounting plate for releasably attaching said implement thereto.

2. A device as claimed in claim 1, wherein said frame extends across the full width of the vehicle.

3. A device as claimed in claim 1, wherein said frame is mounted at the front of the vehicle.

4. A device as claimed in claim 1, wherein said frame is mounted at the rear of the vehicle.

5. A device as claimed in claim 1, wherein said frame is provided at each end with a respective ground-engaging jack.

6. A device as claimed in claim 1, wherein said tool-attachment means is in the form of a mounting frame or plate pivotally mounted on said carriage for tilting about an axis which is normally horizontal when the vehicle is level.

7. A device as claimed in claim 1 wherein said first hydraulic means is a hydraulic cylinder secured to said intermediate carriage and movable on a piston fixed with respect to said mast.

8. A device as claimed in claim 1, wherein said mast is mounted for manual movement across said frame, locking means being provided for locking said mast at any desired position on said frame.

* * * * *